(12) United States Patent
Lu

(10) Patent No.: US 11,853,962 B2
(45) Date of Patent: Dec. 26, 2023

(54) TRACK BARCODE AUTOMATIC MOUNTING SYSTEM AND METHOD OF AMHS

(71) Applicant: CHANGXIN MEMORY TECHNOLOGIES, INC., Anhui (CN)

(72) Inventor: Tong Lu, Anhui (CN)

(73) Assignee: CHANGXIN MEMORY TECHNOLOGIES, INC., Hefei (CN)

( * ) Notice: Subject to any disclaimer, the term of this patent is extended or adjusted under 35 U.S.C. 154(b) by 202 days.

(21) Appl. No.: 17/455,509

(22) Filed: Nov. 18, 2021

(65) Prior Publication Data

US 2022/0076196 A1 Mar. 10, 2022

Related U.S. Application Data

(63) Continuation of application No. PCT/CN2021/095906, filed on May 26, 2021.

(30) Foreign Application Priority Data

Jun. 5, 2020 (CN) .......................... 202010506568.6

(51) Int. Cl.
*G06Q 10/087* (2023.01)
*G06K 19/06* (2006.01)
*G06K 1/12* (2006.01)

(52) U.S. Cl.
CPC ........... *G06Q 10/087* (2013.01); *G06K 1/121* (2013.01); *G06K 19/06028* (2013.01)

(58) Field of Classification Search
CPC . G06Q 10/087; G06K 1/121; G06K 19/06028
(Continued)

(56) References Cited

U.S. PATENT DOCUMENTS 5,570,990 A 11/1996 Bonora et al.
6,092,678 A 7/2000 Kawano
(Continued)

FOREIGN PATENT DOCUMENTS

CN 104555743 A 4/2015
CN 105460328 A 4/2016
(Continued)

OTHER PUBLICATIONS

First Office Action cited in CN202010506568.6, dated Apr. 21, 2022, 16 pages.
(Continued)

*Primary Examiner* — Michael G Lee
*Assistant Examiner* — David Tardif
(74) *Attorney, Agent, or Firm* — Cooper Legal Group, LLC

(57) ABSTRACT

The present application relates to track barcode automatic mounting system and method of an automatic material handling system (AMHS), which system comprises: a running track, at whose position corresponding to an unloading port is provided a barcode mounting region; an overhead hoist transport, installed on the running track, and being moveable along the running track; a locating device, for determining whether the overhead hoist transport has moved to a designated barcode mounting region; a barcode automatic printing and mounting device, disposed on the overhead hoist transport; and a manually operated controller, for sending a movement instruction to the overhead hoist transport to control the overhead hoist transport to move to the designated barcode mounting region, and sending a print confirmation instruction to the barcode automatic printing and mounting device after the overhead hoist transport has moved to the designated barcode mounting region.

10 Claims, 5 Drawing Sheets

(58) Field of Classification Search
USPC ........................................................ 235/385
See application file for complete search history.

(56) References Cited

U.S. PATENT DOCUMENTS

| | | | |
|---|---|---|---|
| 7,054,714 | B2 | 5/2006 | Hocke et al. |
| 8,158,485 | B2 | 4/2012 | Kohler |
| 9,117,853 | B2 | 8/2015 | Tsubaki |
| 11,080,494 | B2* | 8/2021 | Osako ............... G06K 19/06028 |
| 11,242,229 | B2* | 2/2022 | Wieschemann ......... B66C 13/18 |
| 2008/0277760 | A1 | 11/2008 | Kohler et al. |
| 2008/0317565 | A1* | 12/2008 | Menser, Jr. ....... H01L 21/67775 |
| | | | 414/806 |
| 2011/0241845 | A1* | 10/2011 | Sullivan ............ H01L 21/67294 |
| | | | 340/10.42 |
| 2015/0029559 | A1* | 1/2015 | Kifuku .................. G06K 1/121 |
| | | | 358/3.28 |
| 2017/0100949 | A1* | 4/2017 | Celinder .................... B41J 3/01 |
| 2022/0076196 | A1* | 3/2022 | Lu .............................. B41J 3/01 |

FOREIGN PATENT DOCUMENTS

| | | |
|---|---|---|
| CN | 207330164 U | 5/2018 |
| CN | 207725810 U | 8/2018 |
| CN | 208802235 U | 4/2019 |
| CN | 109739195 A | 5/2019 |
| DE | 202013103136 U1 | 8/2013 |

OTHER PUBLICATIONS

International Search Report as cited in PCT Application No. PCT/CN2021/095906 dated Jul. 28, 2021, 10 pages.
Written Opinion cited in PCT/CN2021/095906, dated Jul. 28, 2021, 7 pages.

* cited by examiner

TRACK BARCODE AUTOMATIC MOUNTING SYSTEM AND METHOD OF AMHS

CROSS-REFERENCE TO RELATED APPLICATIONS

The present application is a continuation application of International Patent Application No. PCT/CN2021/095906, filed on May 26, 2021, which claims the right of priority to Chinese Patent Application 202010506568.6, filed before the Chinese Patent Office on Jun. 5, 2020 and entitled "Track Barcode Automatic Mounting System and Method of AMHS". The entire contents International Patent Application No. PCT/CN2021/095906 and Chinese Patent Application 202010506568.6 are herein incorporated by reference.

TECHNICAL FIELD

The present application relates to the technical field of material handling systems of semiconductor integrated circuits, and more particularly to track barcode automatic mounting system and method of an automatic material handling system (AMHS).

BACKGROUND

The Automatic Material Handling System (hereinafter referred to as "AMHS") exerts a very important function in a semiconductor factory. The currently available AMHS mainly consists of plural tracks hanging on the ceiling, overhead hoist transports (OHTs) moving on the tracks to convey front opening unified pods (hereinafter referred to as "FOUPs") and a corresponding control system.

Currently, once a new machine is introduced, it is required to mount barcodes at fixed positions above all load ports in the AMHS, only then can the overhead hoist transport identify the barcode at the corresponding position and dispose the FOUP. At present, each semiconductor factory needs to mount approximately 5,000 track barcodes on average; the mounting operation of track barcodes mainly consists of three steps of printing and fabricating, locating, and mounting and fixing. These three steps are all to be manually executed, of which the locating, and mounting and fixing steps require coordinated action of plural personnel, and the step of mounting and fixing requires climbing work, occupies a great deal of manpower and material consumption, and causes waste of a lot of time.

SUMMARY

In view of the above, it is necessary to aim at the prior-art problem that manual mounting of track barcodes is low in efficiency and high in resource consumption, to thereby provide a track barcode automatic mounting system and a track barcode automatic mounting method of an AMHS capable of effectively enhancing the mounting efficiency of track barcodes.

The proposed track barcode automatic mounting system of an AMHS comprises:
a running track, at whose position corresponding to an unloading port is provided a barcode mounting region;
an overhead hoist transport, installed on the running track, and being moveable along the running track;
a locating device, for determining whether the overhead hoist transport has moved to a designated barcode mounting region;
a barcode automatic printing and mounting device, disposed on the overhead hoist transport; and
a manually operated controller, for sending a movement instruction to the overhead hoist transport to control the overhead hoist transport to move to the designated barcode mounting region, and sending a print confirmation instruction to the barcode automatic printing and mounting device after the overhead hoist transport has moved to the designated barcode mounting region; wherein the barcode automatic printing and mounting device bases on the print confirmation instruction to print a corresponding barcode, and mounts a barcode base plate on which is stuck the corresponding barcode onto the barcode mounting region.

In one of the embodiments, the barcode automatic printing and mounting device includes a first signal receiver, a thermal printer, a labeling mechanism, a mounting mechanism and a first control unit, wherein
the first signal receiver is for receiving the print confirmation instruction that includes barcode numbering information;
the first control unit is connected to the first signal receiver, the thermal printer, the labeling mechanism and the mounting mechanism respectively, for basing on the received print confirmation instruction to control the thermal printer to print a barcode printing paper with a corresponding barcode number printed thereon, to control the labeling mechanism for action to label the barcode printing paper with the barcode number printed thereon onto the barcode base plate, and to control the mounting mechanism to mount the barcode base plate labeled with the barcode printing paper to the barcode mounting region.

In one of the embodiments, on the barcode base plate is provided an adhesive surface for sticking the barcode printing paper.

In one of the embodiments, a torsion spring is disposed on a rotary clasp of the barcode base plate.

In one of the embodiments, the barcode automatic printing and mounting device further includes a housing, a printing paper filling port, a barcode base plate filling port, a mounting port, a conveyor device and a conveying mechanism, wherein
the housing is disposed on the overhead hoist transport, the first signal receiver, the thermal printer, the labeling mechanism, the mounting mechanism, the first control unit, the conveyor device and the conveying mechanism are all housed in the housing;
the printing paper filling port is disposed at one end of the housing, for filling printing paper to the thermal printer;
the barcode base plate filling port is disposed at an end of the housing, for filling the barcode base plate to the conveyor device;
the mounting port is disposed at top of the housing, for enabling the barcode base plate to protrude from the housing under action of the mounting mechanism to facilitate mounting;
the conveyor device is disposed on the conveying mechanism, and the mounting mechanism is disposed on the conveyor device; and
the conveying mechanism is connected to the first control unit, for conveying the conveyor device that is filled with the barcode base plate from the barcode base plate filling port to a corresponding position of the labeling mechanism.

In one of the embodiments, the labeling mechanism is located right below the mounting port.

In one of the embodiments, the locating device is a laser disposed on the overhead hoist transport.

In one of the embodiments, the overhead hoist transport includes a second control unit, a walking part and a second signal receiver, wherein the second signal receiver is for receiving the movement instruction; and the second control unit is connected to the second signal receiver and the walking part respectively, for basing on the movement instruction to control the walking part to walk on the running track, so as to enable the overhead hoist transport to move to the designated barcode mounting region.

The proposed track barcode automatic mounting method of an AMHS comprises:

sending a movement instruction to an overhead hoist transport according to locating;

wherein the overhead hoist transport is disposed on a running track, at whose position corresponding to an unloading port is provided a barcode mounting region;

basing on the movement instruction to control the overhead hoist transport to move to the designated barcode mounting region;

sending a print confirmation instruction; and basing on the print confirmation instruction to control a barcode automatic printing and mounting device to print a corresponding barcode and to thereafter mount a barcode base plate on which is stuck the corresponding barcode to the barcode mounting region.

In one of the embodiments, the print confirmation instruction includes barcode numbering information, and the step of basing on the print confirmation instruction to control a barcode automatic printing and mounting device to print a corresponding barcode and to thereafter mount a barcode base plate on which is stuck the corresponding barcode to the barcode mounting region includes the following steps:

printing a barcode printing paper with a corresponding barcode number printed thereon;

labeling the barcode printing paper with the barcode number printed thereon onto the barcode base plate; and mounting the barcode base plate labeled with the barcode printing paper to the barcode mounting region.

In the aforementioned track barcode automatic mounting system and method of an AMHS, the overhead hoist transport is controlled according to locating to move to the designated barcode mounting region, and the barcode automatic printing and mounting device disposed on the overhead hoist transport is then controlled to automatically print a corresponding barcode and to thereafter mount the barcode base plate that is stuck with the corresponding barcode to the barcode mounting region, whereby is realized automation of the entire track barcode mounting process, and mounting efficiency of track barcodes is markedly enhanced.

REFERENCE NUMERALS

Figure 1:
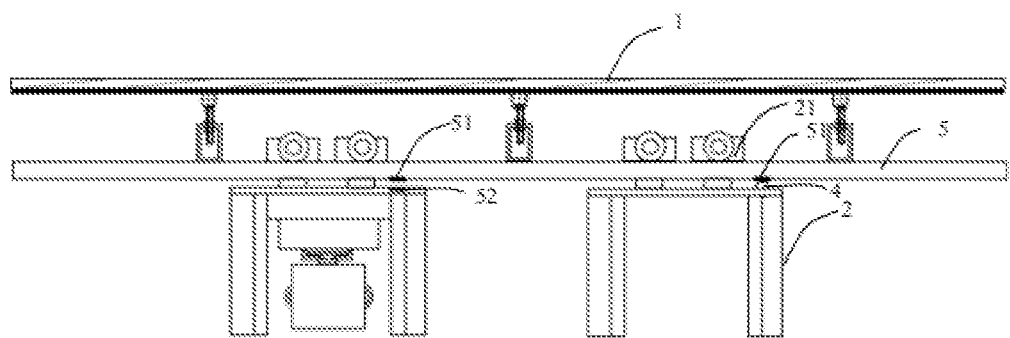
FIG. 1 is a diagram schematically illustrating the structure of the track barcode automatic mounting system of an AMHS according to the present application.

1—ceiling; 2—overhead hoist transport; 21—walking part; 22—second signal receiver; 23—second receiving unit; 3—barcode base plate; 31—adhesive surface; 32—clasp; 33—torsion spring; 4—barcode automatic printing and mounting device; 41—thermal printer; 42—conveyor device; 43—labeling mechanism; 44—mounting mechanism; 45—barcode base plate filling port; 46—printing paper filling port; 47—mounting port; 48—conveying mechanism; 481—horizontally moving motor; 482—leather belt; 483—track; 49—housing; 5—running track; 51—barcode mounting region; 52—code scanner; 6—manually operated controller; 7—locating device; 71—unloading port; 8—maintenance rack; 9—printing paper; 91—barcode printing paper.

DESCRIPTION OF EMBODIMENTS

In order to make the aforementioned objectives, characteristics and advantages of the present application more apparent and comprehensible, specific embodiments of the present application will be described in greater detail below with reference to the accompanying drawings. Many specific details are enunciated below for a fuller understanding of the present application. However, the present application can be implemented by other modes different from those described in this context, and persons skilled in the art may make similar improvements without departing from the conception of the present application, so the present application is not restricted to the specific embodiments made public below.

As should be understood, in the description of the present application, directions or positional relations indicated by such wordings as "central", "longitudinal", "transversal", "length", "width", "thickness", "above", "under", "front", "rear", "left", "right", "vertical", "horizontal", "top", "bottom", "inside", "outside", "clockwise", "counterclockwise", "axial", "radial" and "circumferential" are directed to directions or positional relations on the basis of the accompanying drawings, and are used merely to facilitate description of the present application and simplify the description, whereas they are not to be construed as indicating or implying specific directions necessarily possessed by the indicated devices or elements, or necessarily configuring and operating the indicated devices or elements by certain directions, so they are not to be understood as restrictions to the present application.

Moreover, technical wordings "first" and "second" are used merely for the purpose of description, and should not be understood as indicating or implying relative importance or the number of technical features implied or indicated thereby. Accordingly, features defined by "first", "second" can explicate or implicate the inclusion of at least one such feature. In the description of the present application, "a plurality of", "plural" mean the inclusion of at least two, for instance, two, or three, unless otherwise definitely defined.

In the present application, unless otherwise definitely prescribed or defined, such technical terms as "mount", "being connected to", "connect with" and "fixing/fixed" should be understood in their broad sense, for instance, the connection may be fixed, detachable, integrated, mechanical, electrical, direct, or indirect through an intermediary, and the connection may be internal communication of two elements or complementary interrelation between two elements, unless definitely defined otherwise. To persons ordinarily skilled in the art, specific meanings of such technical terms as they are used in the present application can be understood according to specific circumstances.

In the present application, unless otherwise definitely prescribed or defined, a first feature being "on" or "under" a second feature may mean direct contact of the first and second features, or mean indirect contact of the first and second features through an intermediary. Moreover, the first feature being "above", "over", "on top of" the second feature may indicate that the first feature is right above or slantwise above the second feature, or merely indicate that the first feature is horizontally higher than the second feature. The first feature being "below", "under", "at the bottom of" the second feature may indicate that the first feature is right below or slantwise below the second feature, or merely indicate that the first feature is horizontally lower than the second feature.

As should be noted, when an element is referred to as being "fixed on" or "disposed at" another element, it can be directly on the other element or there may be an intermediate element. When an element is referred to as being "connected to" another element, it can be directly connected to the other element or there may be an intermediate element at the same time. Such technical wordings as "perpendicular", "horizontal", "above", "below", "left", "right" and similar expressions as used in this context are merely for the purpose of description, and are not used to indicate exclusive modes of implementation.

As shown in the left portion of FIG. 1, the overhead hoist transport 2 should be identified as to its position through a barcode in the barcode mounting region 51 on the running track 5. In one embodiment, it is usual to dispose a code scanner 52 on the overhead hoist transport 2, it is usual to dispose a barcode belt on the running track 5, each barcode has a unique coded address, the overhead hoist transport 2 moves along the running track 5 disposed under the ceiling 1 and conveys FOUPs to a destination site, and the overhead hoist transport 2 identifies barcode information of the current position through the code scanner 52 and sends the barcode information to an overhead hoist transport control system for position identification; currently, the circumstance in which barcode mounting should be manually realized calls for a great deal of manpower and material resources, and wastes a lot of time.

Figure 2:
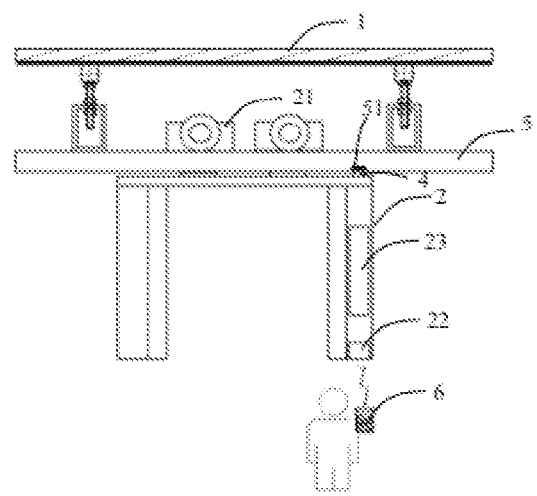
FIG. 2 is a diagram schematically illustrating the structure of the manually held controller with the overhead hoist transport in the track barcode automatic mounting system of an AMHS according to the present application.
Figure 5:
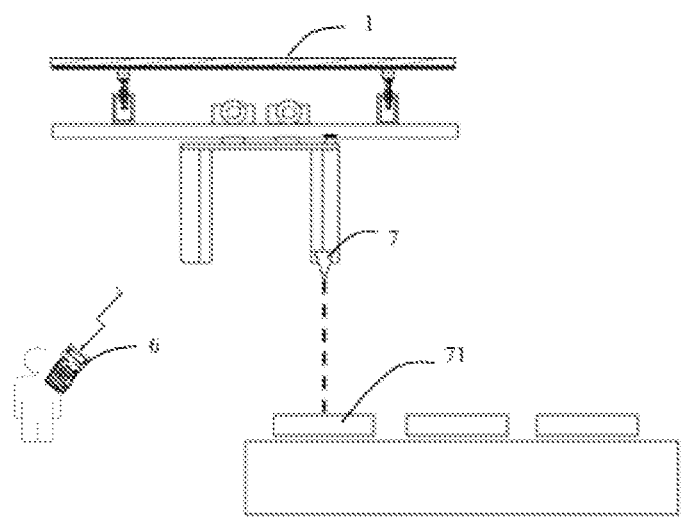
FIG. 5 is a diagram schematically illustrating a specific locating realizing method of the locating device in the track barcode automatic mounting system of an AMHS in one embodiment of the present application.

As shown in FIGS. 1, 2 and 5, in order to solve the aforementioned problem, the present application proposes a track barcode automatic mounting system of an AMHS, which system comprises a running track 5 disposed on a ceiling 1, an overhead hoist transport 2, a locating device 7, a barcode automatic printing and mounting device 4, and a manually operated controller 6, wherein on the running track 5 is disposed a barcode mounting region 51 at a position corresponding to an unloading port 71; the overhead hoist transport 2 is installed on the running track 5 and is moveable along the running track 5; the locating device 7 is employed to determine whether the overhead hoist transport 2 has moved to the designated barcode mounting region 51; the barcode automatic printing and mounting device 4 is disposed on the overhead hoist transport 2; the manually operated controller 6 is employed to send a movement instruction to the overhead hoist transport 2 to control the overhead hoist transport 2 to move to the designated barcode mounting region 51, and send a print confirmation instruction to the barcode automatic printing and mounting device 4 after the overhead hoist transport 2 has moved to the designated barcode mounting region 51; the barcode automatic printing and mounting device 4 bases on the print confirmation instruction to print a corresponding barcode, and mounts a barcode base plate 3 that is stuck with the corresponding barcode to the barcode mounting region 51.

In the track barcode automatic mounting system of an AMHS according to the present application, the overhead hoist transport 2 is controlled according to locating to move to the designated barcode mounting region, and the barcode automatic printing and mounting device disposed on the overhead hoist transport 2 is then controlled to automatically print a corresponding barcode and to thereafter mount the barcode base plate that is stuck with the corresponding barcode to the barcode mounting region 51, whereby is realized automation of the entire track barcode mounting process, and mounting efficiency of track barcodes is markedly enhanced.

By way of example, the overhead hoist transport 2 can be embodied as a currently available overhead hoist transport for conveying FOUPs, so as to achieve excellent compatibility with currently available AMHS systems, and to further lower the production cost at the same time. Of course, in other examples, the overhead hoist transport can also be embodied as one of other moving mechanisms possessing running capability; as shown in FIG. 5, the locating device 7 can be embodied as a laser that is disposed at a corresponding position on the overhead hoist transport 2, the projected position of the laser beam emitted by the laser serves as the basis of location;

in this example, as shown in FIG. 5, the unloading port 71 can be utilized to help locate—the operating personnel observes the projected position of a beam emitted by the laser during the moving process of the overhead hoist transport 2, when the laser beam is projected just at the central position of the unloading port 71, location is successful; of course, in other examples, the locating device 7 can also be embodied as one of other locating units possessing automatic locating function to communicate with the overhead hoist transport control system to realize automatic locating of the overhead hoist transport 2—to which no restriction is made in this context.

Figure 3:
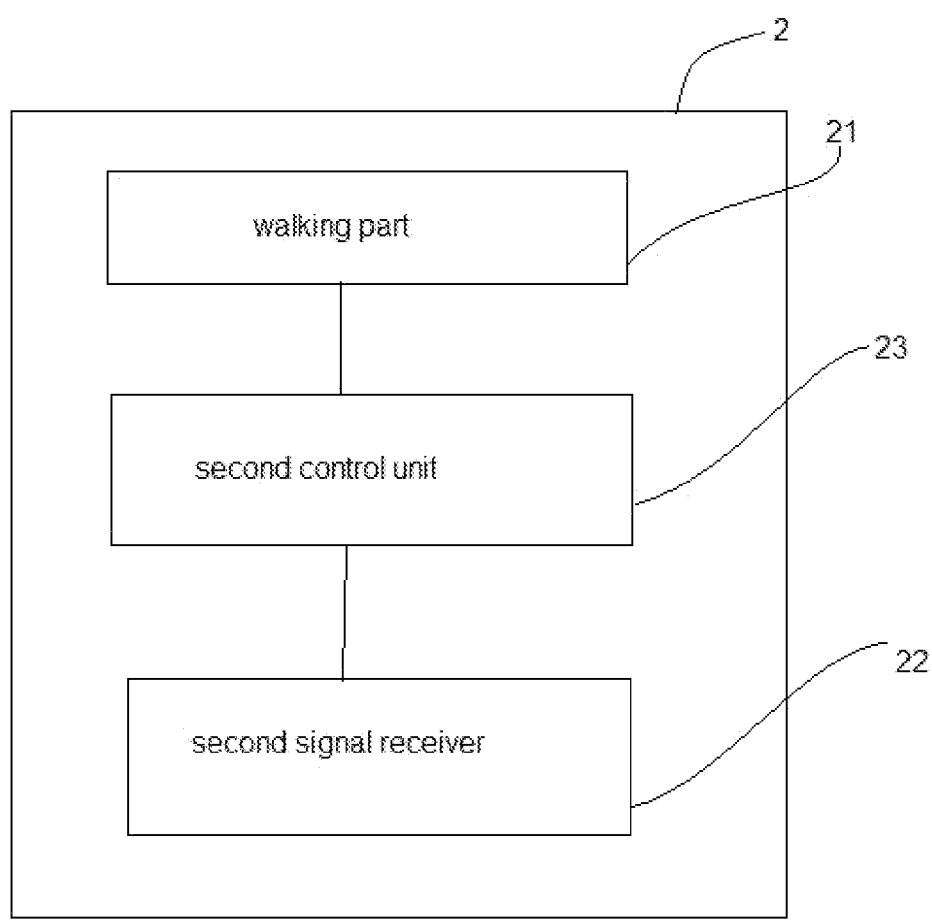
FIG. 3 is a block diagram illustrating the specific structure of the overhead hoist transport in the track barcode automatic mounting system of an AMHS in one embodiment of the present application.

As shown in FIGS. 2 and 3, in one of the embodiments, the overhead hoist transport 2 includes a second control unit 23, a walking part 21 and a second signal receiver 22, of which the second signal receiver 22 is employed to receive movement instructions. In one embodiment, the second signal receiver 22 can realize dispatch of instructions with the manually operated controller 6 wirelessly; the second control unit 23 is connected to the second signal receiver 22 and the walking part 21 respectively, and is employed to base on the movement instruction to control the walking part 21 to walk on the running track 5, so as to enable the overhead hoist transport 2 to move to the designated barcode mounting region 51.

Figure 4:
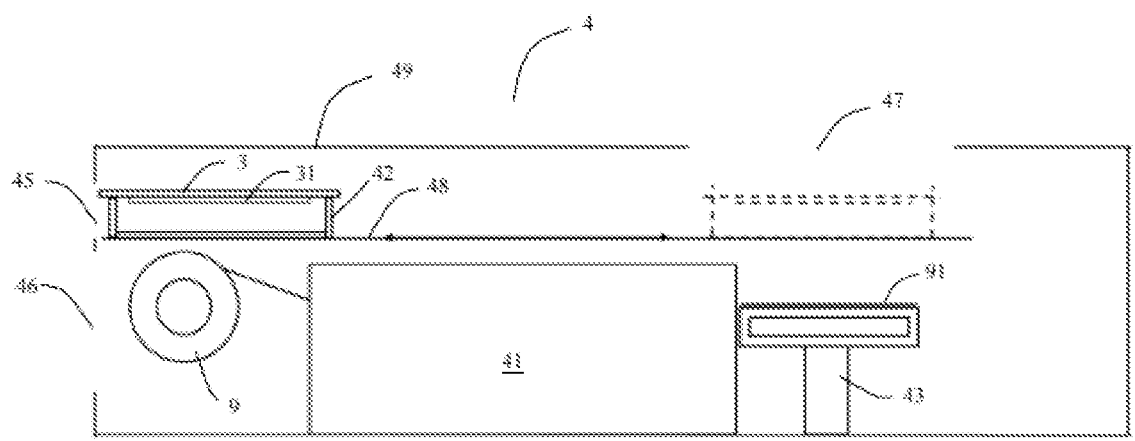
FIG. 4 is a diagram schematically illustrating the specific structure of the barcode automatic printing and mounting device in the track barcode automatic mounting system of an AMHS in one embodiment of the present application.
Figure 6:
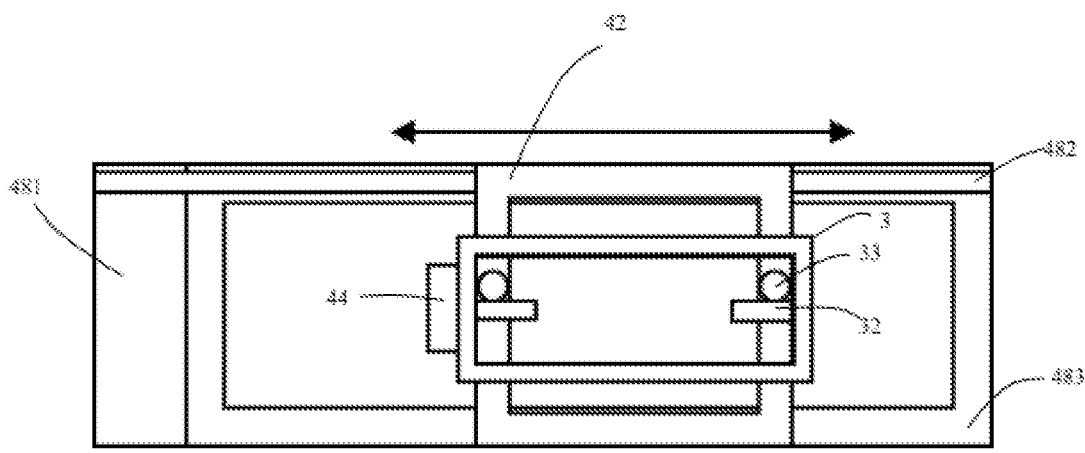
FIG. 6 is a vertical view illustrating the combined structure of the conveyor device, the conveying mechanism and the barcode base plate in the track barcode automatic mounting system of an AMHS in one embodiment of the present application.
Figure 7:
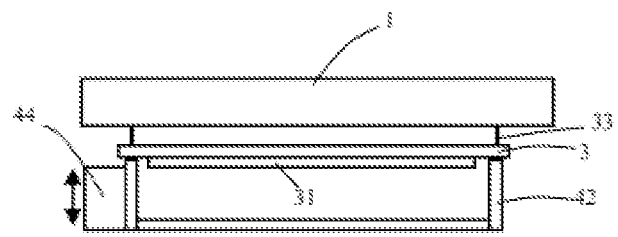
FIG. 7 is a main view illustrating the combined structure of the barcode base plate and the mounting mechanism in the track barcode automatic mounting system of an AMHS in one embodiment of the present application.

As shown in FIGS. 4, 6 and 7, in one of the embodiments, the barcode automatic printing and mounting device 4 includes a first signal receiver (not shown in these Figures), a thermal printer 41, a labeling mechanism 43, a mounting mechanism 44 and a first control unit (not shown in the Figures), wherein the first signal receiver is employed to receive the print confirmation instruction that includes barcode numbering information; the first control unit is connected to the first signal receiver, the thermal printer 41, the labeling mechanism 43 and the mounting mechanism 44 respectively, and is employed to base on the received print confirmation instruction to control the thermal printer 41 to print a barcode printing paper 91 with a corresponding barcode number printed thereon, to control the labeling mechanism 43 for action to label the barcode printing paper 91 with a barcode number printed thereon onto the barcode base plate 3, and to control the mounting mechanism 44 to mount the barcode base plate 3 with the barcode printing paper 91 labeled thereon to the barcode mounting region 51.

By way of example, dispatch of instructions between the first signal receiver and the manually operated controller 6 can be realized via wireless communication, so as to reduce wiring.

By way of example, since the conventional printing paper 9 usually does not possess viscosity, the operating personnel may dispose in advance on the barcode base plate 3 an adhesive surface 31 for sticking the barcode printing paper 91. In this example, the adhesive surface 31 is stuck at the frontal position of the barcode base plate 3; the labeling mechanism 43 can be embodied as a telescopic device possessing lifting function, such as an electric motor, the distal end of the telescopic device is provided with a platform for placing printing papers printed by the thermal printer 41, and the printing paper outlet of the thermal printer 41 corresponds to the platform of the labeling mechanism 43, so as to facilitate output of the printed barcode printing paper 91 with a barcode number printed thereon onto the platform; when labeling is needed, the labeling mechanism 43 is lifted under control, and the platform gradually approaches the barcode base plate 3 (the place represented by dotted lines in the Figures is the region where the barcode base plate 3 is located after having been conveyed by the conveying mechanism 48 to arrive at the labeling position), when the platform touches the barcode base plate 3 it comes into contact with the adhesive surface 31 on the barcode printing paper 91, and the barcode printing paper 91 with a barcode number printed thereon is adhered onto the barcode base plate 3 via the adhesive surface 31, thus the barcode adhering process is completed. By way of example, the mounting mechanism 44 can be embodied as a lifting mechanism or one of other powered mechanisms; in this example, the mounting mechanism 44 is embodied as a lifting motor.

The barcode automatic printing and mounting device 4 in the track barcode automatic mounting system of an AMHS according to the present application is designed with few parts, occupies few space, integrates the two functions of automatic printing and labeling, and is used safely and reliably.

As shown in FIG. 4, in one of the embodiments, in order to make it easy for the operating personnel to fill barcode base plates 3 and printing papers in the thermal printer 41 and to protect various component parts, the barcode automatic printing and mounting device 4 further includes a housing 49, a printing paper filling port 46, a barcode base plate filling port 45, a mounting port 47, a conveyor device 42 and a conveying mechanism 48.

By way of example, the housing 49 is disposed on the overhead hoist transport 2, the first signal receiver (not shown in the Figure), the thermal printer 41, the labeling mechanism 43, the mounting mechanism 44, the first control unit (not shown in the Figure), the conveyor device 42 and the conveying mechanism 48 are all housed in the housing 49, to be better protected there.

By way of example, in order to facilitate filling of printing papers into the thermal printer 41 and filling of barcode base plate 3 into the conveyor device 42, at one end of the housing 49 are disposed a printing paper filling port 46 and a barcode base plate filling port 45; in order to enable the barcode base plate 3 to protrude out of the housing 49 under action of the mounting mechanism 44 so as to facilitate mounting, on top of the housing 49 is disposed a mounting port 47; the conveyor device 42 is disposed on the conveying mechanism 48, and the mounting mechanism 44 is disposed on the conveying mechanism 48; the conveying mechanism 48 is connected to the first control unit, and is employed to convey the conveyor device 42 that is filled with a barcode base plate 3 from the barcode base plate filling port 45 to a corresponding position of the labeling mechanism 43, and the labeling mechanism 43 is located right below the mounting port 47, so as to make consistent the final barcode labeling position with the starting position for mounting the barcode base plate 3, thus enhancing positional precision of the automatic mounting; by way of example, as shown in FIG. 6, the conveying mechanism 48 can be realized by a horizontally moving motor 481, a leather belt 482 and a guiderail 483.

Figure 8:
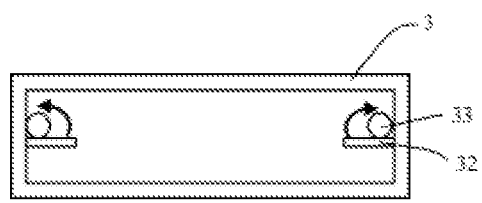
FIG. 8 is a vertical view illustrating the barcode base plate that is provided with a torsion spring in the track barcode automatic mounting system of an AMHS in one embodiment of the present application.

As shown in FIGS. 6-8, since the mode of fixing the currently available barcode base plate 3 onto the track is effected by its being clasped into the groove of the running track 5 by means of a rotary clasp 32, mounting of the barcode base plate 3 is realized by each time manually rotating the rotary clasp 32; in order to adapt to the automatic mounting process of the present application, in this example, a torsion spring 33 is installed on the original clasp 32 and the barcode base plate 3 is pre-clasped before mounting in the rotary clasp 32, thus, the original manpower is replaced by the power of the torsion spring 33 by providing the torsion spring 33 on the rotary clasp 32 of the barcode base plate 3, after the top surface of the barcode base plate 3 is lifted under action of the mounting mechanism 44 and abuts against the running track 5, the portion that clasps the torsion spring 33 is held up, and the rotary clasp 32 is clasped in the groove of the running track 5 under the combined action of the torsion spring 33 and the mounting mechanism 44.

Figure 9:
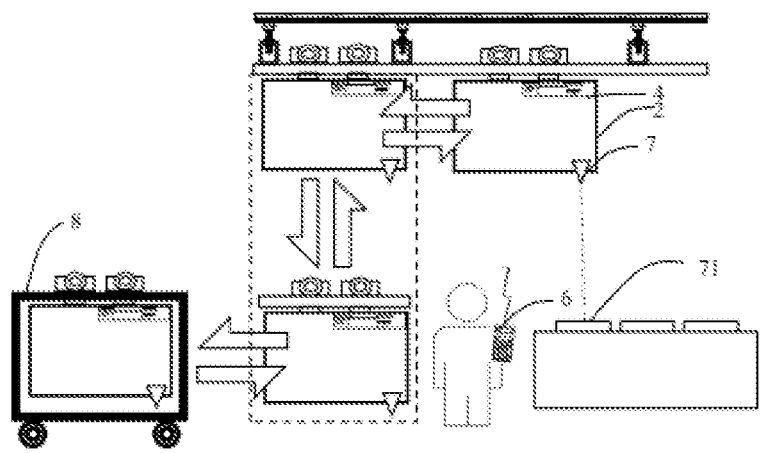
FIG. 9 is a diagram schematically illustrating a complete track barcode automatic mounting process of the track barcode automatic mounting system of an AMHS in one embodiment of the present application.

The operating mode of the track barcode automatic mounting system of an AMHS according to the present application is further described below. As shown in FIG. 9, during specific operation, the operating personnel firstly moves the overhead hoist transport 2 with a barcode automatic printing and mounting device 4 near an automatic lift via a maintenance rack 8, the printing paper and the barcode base plate 3 are placed inside the barcode automatic printing and mounting device 4, the automatic lift is controlled to lift the overhead hoist transport 2 onto the running track 5, the operating personnel controls the overhead hoist transport 2 via the manually operated controller 6 to move near the designated barcode mounting region 51, the overhead hoist transport 2 is further precisely located by a combination of the locating device 7 with the unloading port 71, the overhead hoist transport 2 is again controlled via the manually operated controller 6 to move to the designated barcode mounting region 51, the barcode number is input into the manually operated controller 6 and location is determined, and the barcode automatic printing and mounting device 4 automatically prints the code number, sticks the barcode onto the barcode base plate 3, and mounts the barcode base plate 3 onto the running track 5.

The present application further provides a track barcode automatic mounting method of an AMHS, which method can be, but is not restricted to be, realized by the aforementioned system, and which method comprises the following steps:

sending a movement instruction to an overhead hoist transport 2 according to locating; wherein the overhead hoist transport 2 is disposed on a running track 5, at whose position corresponding to an unloading port 71 is provided a barcode mounting region 51;

basing on the movement instruction to control the overhead hoist transport 2 to move to the designated barcode mounting region 51;

sending a print confirmation instruction; and basing on the print confirmation instruction to control a barcode automatic printing and mounting device 4 to print a corresponding barcode and to thereafter mount a barcode base plate 3 on which is stuck the corresponding barcode to the barcode mounting region 51.

In one of the embodiments, the print confirmation instruction includes barcode numbering information, and the step of basing on the print confirmation instruction to control a barcode automatic printing and mounting device 4 to print a corresponding barcode and to thereafter mount a barcode base plate 3 on which is stuck the corresponding barcode to the barcode mounting region 51 includes the following steps:

printing a barcode printing paper 91 with a corresponding barcode number printed thereon;

labeling the barcode printing paper 91 with the barcode number printed thereon onto the barcode base plate 3; and mounting the barcode base plate 3 labeled with the barcode printing paper 91 to the barcode mounting region 51.

The various technical features of the aforementioned embodiments can be randomly combined; for the sake of brevity, all possible combinations of the various technical features of the aforementioned embodiments are not exhausted; however, insofar as the combinations of the technical features are not contradictory to one another, they shall all be regarded as within the scope described in this Description.

The aforementioned embodiments merely indicate several modes to implement the present application, and their descriptions are relatively specific and detailed, but they should not be therefore understood as restriction to the inventive patent scope. As should be pointed out, persons ordinarily skilled in the art may make various modifications and improvements without departing from the conception of the present application, and all such modifications and improvements shall fall within the protection scope of the present application. Accordingly, the protection scope of the present application shall be as claimed in the attached Claims.

What is claimed is:

1. A track barcode automatic mounting system of an automatic material handling system (AMHS), comprising:
   a running track, at whose position corresponding to an unloading port is provided a barcode mounting region;
   an overhead hoist transport, installed on the running track, and being moveable along the running track;
   a locating device, for determining whether the overhead hoist transport has moved to a designated barcode mounting region;
   a barcode automatic printing and mounting device, disposed on the overhead hoist transport; and
   a manually operated controller, for sending a movement instruction to the overhead hoist transport to control the overhead hoist transport to move to the designated barcode mounting region, and sending a print confirmation instruction to the barcode automatic printing and mounting device after the overhead hoist transport has moved to the designated barcode mounting region; wherein the barcode automatic printing and mounting device bases on the print confirmation instruction to print a corresponding barcode, and mounts a barcode base plate on which is stuck the corresponding barcode onto the barcode mounting region.

2. The track barcode automatic mounting system of an AMHS according to claim 1, wherein the barcode automatic printing and mounting device includes a first signal receiver, a thermal printer, a labeling mechanism, a mounting mechanism and a first control unit, wherein
   the first signal receiver is for receiving the print confirmation instruction that includes barcode numbering information; and wherein
   the first control unit is connected to the first signal receiver, the thermal printer, the labeling mechanism and the mounting mechanism respectively, for basing on the received print confirmation instruction to control the thermal printer to print a barcode printing paper with a corresponding barcode number printed thereon, to control the labeling mechanism for action to label the barcode printing paper with the barcode number printed thereon onto the barcode base plate, and to control the mounting mechanism to mount the barcode base plate labeled with the barcode printing paper to the barcode mounting region.

3. The track barcode automatic mounting system of an AMHS according to claim 2, wherein the barcode base plate is provided an adhesive surface for sticking the barcode printing paper.

4. The track barcode automatic mounting system of an AMHS according to claim 2, wherein a torsion spring is disposed on a rotary clasp of the barcode base plate.

5. The track barcode automatic mounting system of an AMHS according to claim 2, wherein the barcode automatic printing and mounting device further includes a housing, a printing paper filling port, a barcode base plate filling port, a mounting port, a conveyor device and a conveying mechanism, wherein the housing is disposed on the overhead hoist transport, the first signal receiver, the thermal printer, the labeling mechanism, the mounting mechanism, the first control unit, the conveyor device and the conveying mechanism are all housed in the housing;

the printing paper filling port is disposed at one end of the housing, for filling printing paper to the thermal printer;

the barcode base plate filling port is disposed at an end of the housing, for filling the barcode base plate to the conveyor device;

the mounting port is disposed at top of the housing, for enabling the barcode base plate to protrude from the housing under action of the mounting mechanism to facilitate mounting;

the conveyor device is disposed on the conveying mechanism, and the mounting mechanism is disposed on the conveyor device; and the conveying mechanism is connected to the first control unit, for conveying the conveyor device that is filled with the barcode base plate from the barcode base plate filling port to a corresponding position of the labeling mechanism.

6. The track barcode automatic mounting system of an AMHS according to claim 5, wherein the labeling mechanism is located right below the mounting port.

7. The track barcode automatic mounting system of an AMHS according to claim 1, wherein the locating device is a laser disposed on the overhead hoist transport.

8. The track barcode automatic mounting system of an AMHS according to claim 1, wherein the overhead hoist transport includes a second control unit, a walking part and a second signal receiver, wherein the second signal receiver is for receiving the movement instruction; and the second control unit is connected to the second signal receiver and the walking part respectively, for basing on the movement instruction to control the walking part to walk on the running track, so as to enable the overhead hoist transport to move to the designated barcode mounting region.

9. A track barcode automatic mounting method of an automatic material handling system (AMHS), comprising:

sending a movement instruction to an overhead hoist transport according to locating; wherein the overhead hoist transport is disposed on a running track, at whose position corresponding to an unloading port is provided a barcode mounting region;

basing on the movement instruction to control the overhead hoist transport to move to the barcode mounting region;

sending a print confirmation instruction; and basing on the print confirmation instruction to control a barcode automatic printing and mounting device to print a corresponding barcode and to thereafter mount a barcode base plate on which is stuck the corresponding barcode to the barcode mounting region.

10. The track barcode automatic mounting method of an AMHS according to claim 9, wherein the print confirmation instruction includes barcode numbering information, and that the step of basing on the print confirmation instruction to control a barcode automatic printing and mounting device to print a corresponding barcode and to thereafter mount a barcode base plate on which is stuck the corresponding barcode to the barcode mounting region includes the following steps:

printing a barcode printing paper with a corresponding barcode number printed thereon;

labeling the barcode printing paper with the barcode number printed thereon onto the barcode base plate; and mounting the barcode base plate labeled with the barcode printing paper to the barcode mounting region.

* * * * *